United States Patent [19]

Dingess

[11] 4,007,944
[45] Feb. 15, 1977

[54] YIELDING SUPPORT FOR VEHICLE MUD FLAP

[76] Inventor: Jack L. Dingess, 1190 Manitoulin Pike, Brunswick, Ohio 44212

[22] Filed: Dec. 16, 1975

[21] Appl. No.: 641,263

[52] U.S. Cl. .......................... 280/154.5 R; 248/204
[51] Int. Cl.² ...................................... B62D 25/16
[58] Field of Search ............ 280/154.5 R; 248/204, 248/289, 475 B; 211/96, 47

[56] References Cited
UNITED STATES PATENTS

| 2,660,453 | 11/1953 | Russell | 280/154.5 R |
| 2,801,867 | 8/1957 | Childreth | 280/154.5 R |
| 2,970,849 | 2/1961 | Betts | 280/154.5 R |
| 3,848,842 | 11/1974 | Jepsen | 280/154.5 R |
| 3,954,281 | 5/1976 | Juergens | 280/154.5 R |

*Primary Examiner*—Robert R. Song
*Attorney, Agent, or Firm*—Brady, O'Boyle & Gates

[57] ABSTRACT

A mud flap or guard for vehicle wheels is supported yieldingly by a relatively rigid rod having a positive and secure pivotal mounting at one end thereof. Angular displacement of the flap and its supporting rod about the axis of the pivotal mounting is yieldingly resisted by opposing compression springs having spring tension adjusting and mounting means connected with the rod and with a bracket structure which carries the positive pivotal mounting.

8 Claims, 6 Drawing Figures

U.S. Patent  Feb. 15, 1977  4,007,944
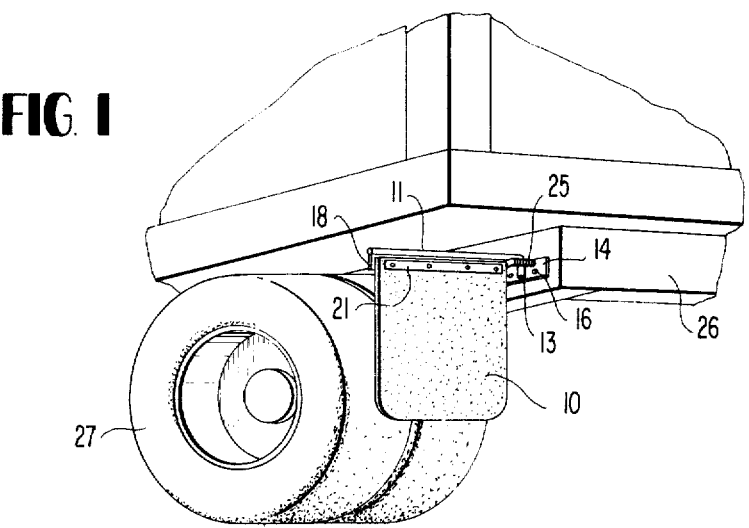
FIG. 1
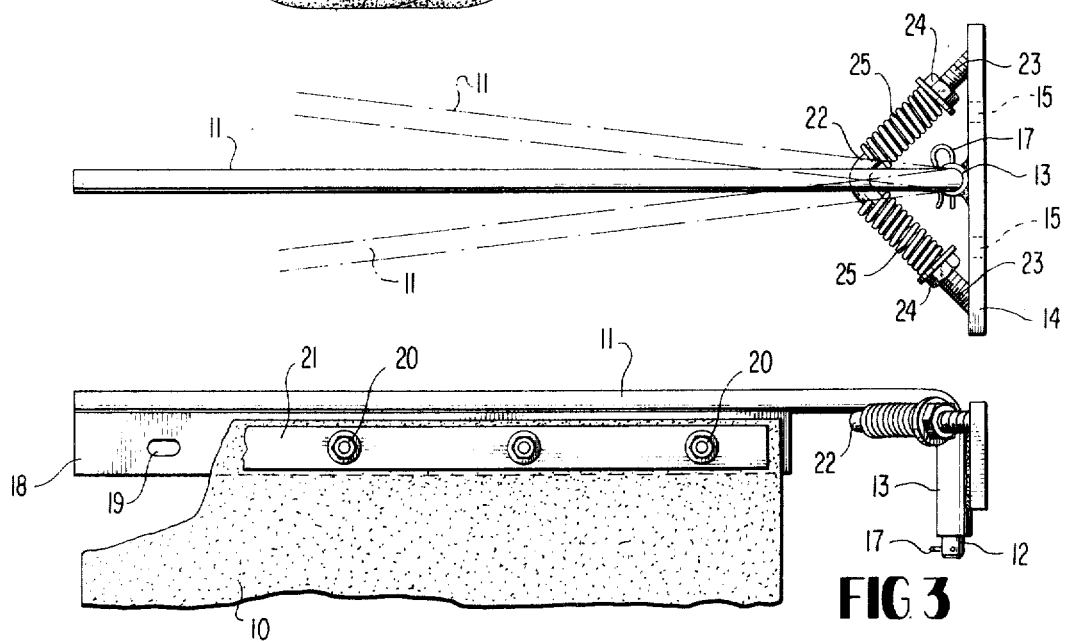
FIG. 2
FIG. 3
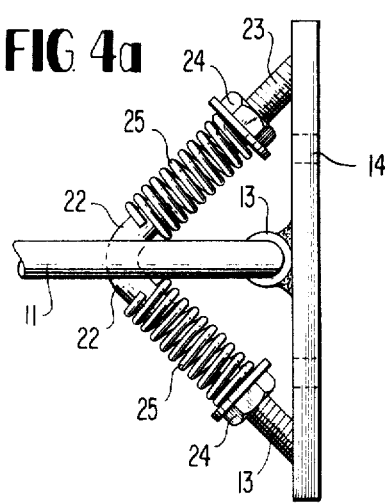
FIG. 4a
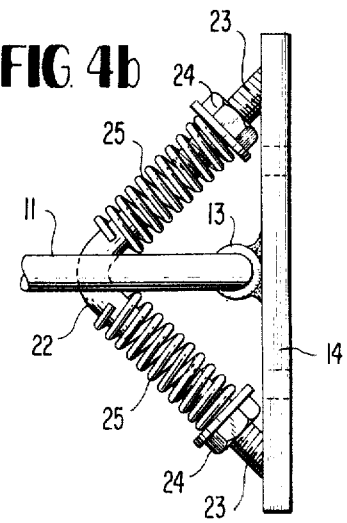
FIG. 4b
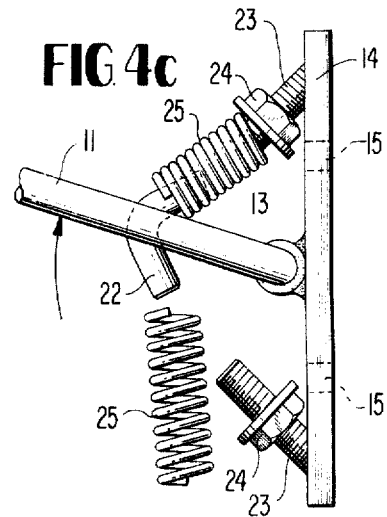
FIG. 4c

YIELDING SUPPORT FOR VEHICLE MUD FLAP

BACKGROUND OF THE INVENTION

Flexible mud or splash guards, sometimes called flaps or pebble guards, are commonly employed on trucks and the like behind the rear wheels to protect following vehicles and particularly to protect the windshields of such vehicles. Such flaps or guards are customarily mounted on relatively rigid supports which are subject to breaking following repeated flexure due to wind currents or due to impact by external objects. A durable and lasting mounting for mud flaps, without unduly increasing the cost of the product, has been an objective in the prior art for some time.

As a result, a number of prior United States patents have been issued which disclose yielding supports or mountings for mud flaps. Several examples of the prior art patents along this line are U.S. Pat. Nos. 2,660,453; 2,865,655 and 2,872,211.

While the teachings of the prior art patents are an improvement over the older non-yielding or non-self-adjusting mounts for mud flaps, nevertheless the prior art teachings fail to completely solve the problem from several practical standpoints. In some prior art devices, the rod or holder from which the flap is suspended is supported entirely by springs. While this renders the mount yielding, it does not assure the required structural integrity needed to prevent separation of the flap from the vehicle under some severe conditions of impact and this can lead to a safety hazard. In other prior art structures employing spring means, the mounting mechanisms are relatively complex and too costly for practical commercial application. None of the prior art structures approaches the problem by employing a positive and firm pivot for the mud flap support arm on an appropriate mounting bracket, with coacting adjustable tension spring means associated with the arm and mounting bracket to yieldingly resist turning or pivoting of the flap and support arm on the axis of the pivot fore or aft. This particular arrangement is essentially incorporated in the present invention, and by this means the invention is thought to completely alleviate the deficiencies of the prior art, as above noted, through a very simple, efficient and economical means. In essence, the present invention as contrasted with prior art proposals is entirely practical and suitable for commercial application to vehicles. Durability and resistance to fatigue and failure of the mud flap support is assured by the invention, as well as safety in that the flap support rod will not become separated from the mounting bracket, due to the use of a positive and secure pivot for the rod or arm, in contrast to a mere spring support or other unstable mount. The yieldability of the mount in two directions under controlled tension by means of the invention solves the problem of durability which is not obtainable through rigid mounts.

Other specific features and advantages of the invention will become apparent during the course of the following detailed description.

BRIEF DESCRIPTION OF THE DRAWING FIGURES

FIG. 1 is a perspective view of a mud flap or guard and its mounting according to the invention.

FIG. 2 is a plan view of the mounting in a neutral position following proper adjustment of spring tension, the flap support arm being shown in fore and aft yield positions in broken lines.

FIG. 3 is a side elevation of the invention as illustrated in FIG. 2.

FIGS. 4A, 4B and 4C are enlarged fragmentary plan views of the device after spring tension adjustment, prior to adjustment and during assembling, respectively.

DETAILED DESCRIPTION

Referring to the drawings in detail wherein like numerals designate like parts throughout, the numeral 10 designates a flexible mud flap or pebble guard formed of rubberlike material, which is dependingly carried by a horizontal support arm or rod 11 having an integral right angular vertical pivot axle extension 12 at one end thereof. The axle extension 12 is received rotatably through a vertical sleeve bearing 13, welded centrally to one side of a flat mounting bracket or plate 14 having spaced openings 15 formed therethrough for the reception of mounting screws 16 shown in FIG. 1. A cotter pin 17 or equivalent means is employed to hold the axle extension 12 captive in the bearing sleeve 13 so that the parts will not separate during usage. It is apparent that the elements 12 and 13 form a positive and secure pivot for the support rod 11 allowing the latter to swing fore or aft horizontally without fatigue or breakage and without fear of separation from the mounting bracket 14.

The top edge portion of the flap 10, FIG. 3, is attached removably to the rod 11 through a depending flat blade 18 attached to the bottom of the rod by welding and having several spaced slots 19 formed therethrough for the reception of bolts 20 which serve to connect the flexible flap to the blade 18. Preferably, a clamping strip or plate 21 is applied to the outer face of the flap 10 beneath washers carried by the bolts 20 to clamp the flap to the blade 18 with even pressure over the full width of the flap. In some cases, a pair of the blades 18 in closely spaced relation may be provided on the rod 11, in which case the flap 10 may be held between these blades by the clamping bolts 20 and the exterior strip 21 will not be needed.

In order to maintain the support rod 11 normally in a neutral position as shown in full lines in FIG. 2, adjustable spring tension yielding means are employed between the support rod and the mounting plate or bracket 14. This yielding means also prevents breakage of the mount or damage thereto under impact as frequently occurs with rigid mud flap mounts.

The yielding means comprises a substantially right angular rod element 22 secured by welding to the bottom of horizontal rod 11 near and forwardly of axle extension 12 with the two equal length arms of the rod element 22 projecting rearwardly toward the axle extension at angles of 45° to the rod 11. Similarly angled screw-threaded studs 23 are welded to the forward face of plate 14 and are axially aligned with the arms of rod element 22 in forwardly converging relation at angles of 45° to the plate 14. Adjusting nuts 24 with washers are provided on the threaded studs 23. Compression coil springs 25 of equal size and strength have their opposite ends slipped over the terminals of rod element 22 and over the adjacent ends of studs 23, the mode of assembly being shown in FIG. 4C.

Following assembly, FIG. 4A, the nuts 24 are adjusted to provide the desired degree of tension in the springs 25. Following this adjustment of spring tension, there is still clearance provided between the spring coils to allow further spring compression when the rod 11 is swung in either direction on its pivot axis formed by the elements 12 and 13. FIG. 4B shows the components following assembly but prior to adjusting spring tension by use of the nuts 24. The degree of adjustment of spring tension can obviously be varied to meet the needs of particular situations of use.

Referring to FIG. 1, the plate or bracket 14 is secured by the screws 16 horizontally to the truck frame 26 aft of rear wheels 27. The support arm or rod 11 in its neutral position under influence of springs 25 projects from the side of frame 26 horizontally and at right angles thereto. However, the mounting allows the rod 11 and flap 10 to swing either fore or aft horizontally about the axis of the positive pivot afforded by the elements 12 and 13. During use, the parts will not break or become fatigued due to bending and they will not be separated by vibration or shock as can occur with many of the prior art devices. The structure is durable and economical to manufacture and quite dependable.

Its several advantages over the prior art should now be apparent without further description.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A mud flap support for vehicles comprising a bracket element adapted for attachment to a vehicle near a wheel thereof, a support arm adapted to carry a depending mud flap and extending from the bracket element substantially horizontally during use, cooperating means on the bracket element and support arm forming a substantially vertical axis positive pivotal connection between said arm and bracket element, whereby the arm can swing fore and aft without separating from the bracket element, and opposing variable tension spring means on opposite sides of said arm and yieldingly interconnecting said arm with said bracket element.

2. A mud flap support for vehicles according to claim 1, wherein said bracket element comprises a plate attachable to a vertical support surface of a vehicle, and said cooperating means including a sleeve bearing element fixedly secured to the forward face of said plate and a substantially right angular axle extension on one end of said arm rotatably engaged within said sleeve bearing element.

3. A mud flap support for vehicles according to claim 2, and retainer element carried by the axle extension and blocking separation thereof from the sleeve bearing element.

4. A mud flap support for vehicles according to claim 1, wherein said opposing variable tension spring means comprises a pair of compressible coil springs, and threaded supporting means for said springs adjustable to vary the tension thereof and having a rigid connection with said bracket element and said support arm.

5. A mud flap support for vehicles according to claim 4, and said threaded supporting means comprises a pair of converging threaded studs secured to the bracket element on opposite sides of said pivotal connection, an element having diverging arms secured to said support arm forwardly of the pivotal connection and with said diverging arms axially aligned with the threaded studs when the support arm is in a neutral position midway between the studs and substantially perpendicular to said bracket element, said coil springs being engaged over opposing ends of the studs and said diverging arms, and adjusting nuts on the studs engageable with corresponding ends of said springs.

6. A mud flat support for vehicles according to claim 5, wherein said element having diverging arms comprises a substantially right angular rod element secured fixedly to the bottom of said support arm near and forwardly of said pivotal connection.

7. A mud flap support for vehicles according to claim 2, wherein said support arm and said right angular axle extension consist of a continuous rod bent near one end to form the axle extension, the remainder of the rod serving to support the mud flap.

8. A mud flap support for vehicles according to claim 7, and a depending blade element on said rod adapted for releasable attachment to a flexible mud flap.

* * * * *